United States Patent
Padiou et al.

(10) Patent No.: US 11,072,135 B2
(45) Date of Patent: Jul. 27, 2021

(54) SEMI-FINISHED LENS TO BE MACHINED FOR FORMING AN OPHTHALMIC LENS TO BE MOUNTED IN A SPECTACLE FRAME, SET AND A METHOD INVOLVING THE SAME

(71) Applicant: ESSILOR INTERNATIONAL, Charenton-le-Pont (FR)

(72) Inventors: Jean-Marc Padiou, Charenton-le-Pont (FR); Jeanne Marchal, Charenton-le-Pont (FR); Jonathan Saulny, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 318 days.

(21) Appl. No.: 16/002,082

(22) Filed: Jun. 7, 2018

(65) Prior Publication Data

US 2018/0354212 A1    Dec. 13, 2018

(30) Foreign Application Priority Data

Jun. 8, 2017 (EP) .................................. 17305680

(51) Int. Cl.
*B29D 11/00* (2006.01)
*B24B 9/20* (2006.01)
(Continued)

(52) U.S. Cl.
CPC .......... *B29D 11/00009* (2013.01); *B24B 9/20* (2013.01); *B24B 13/065* (2013.01);
(Continued)

(58) Field of Classification Search
CPC ...... B29D 11/00009; B29D 11/009661; B24B 9/20; B24B 13/065; G02C 7/02; G02C 7/101; G02C 2202/08; B29K 2669/00
See application file for complete search history.

(56) References Cited

U.S. PATENT DOCUMENTS 4,261,656 A * 4/1981 Wu ..................... G02B 1/105
351/159.56
4,679,918 A * 7/1987 Ace ..................... G02C 7/02
351/159.62
(Continued)

FOREIGN PATENT DOCUMENTS

WO  2014/105048 A1  7/2014
WO  2016/054198 A1  4/2016

OTHER PUBLICATIONS

EP Search Report, dated Nov. 10, 2017, corresponding to EP 17 30 5680 application.

*Primary Examiner* — Dung Van Nguyen
(74) *Attorney, Agent, or Firm* — Nixon & Vanderhye

(57) ABSTRACT

Disclosed is a semi-finished lens that includes a blank formed in a first material having a first hardness, the blank having an outline, a first face and a second face configured to be surfaced so as to constitute a first optical face of the ophthalmic lens, and a top layer formed in a second material having a second hardness greater than the first hardness, the top layer having an outline, a first face and a second face, the second face of the top layer being arranged on the first face of the blank. The outline of the top layer is equal to or included in the outline of the blank, and satisfies to a predetermined dimensional selection criterion involving the final outline of the ophthalmic lens.

19 Claims, 4 Drawing Sheets

(51) Int. Cl.
  *B24B 13/06* (2006.01)
  *G02C 7/02* (2006.01)
  *B29K 669/00* (2006.01)
  *G02C 7/10* (2006.01)
  *G02B 1/14* (2015.01)

(52) U.S. Cl.
  CPC .......... *B29D 11/00961* (2013.01); *G02C 7/02* (2013.01); *B29K 2669/00* (2013.01); *G02B 1/14* (2015.01); *G02C 7/101* (2013.01); *G02C 2202/08* (2013.01); *G02C 2202/16* (2013.01)

(56) References Cited

U.S. PATENT DOCUMENTS

| | | | | |
|---|---|---|---|---|
| 4,781,452 A * | 11/1988 | Ace | | B24B 9/148 351/159.74 |
| 4,793,703 A * | 12/1988 | Fretz, Jr. | | G02C 7/02 351/159.62 |
| 4,883,548 A * | 11/1989 | Onoki | | B29D 11/00009 156/99 |
| 8,367,211 B2 * | 2/2013 | Qin | | B32B 27/08 428/423.1 |
| 2001/0028435 A1 | 10/2001 | Evans et al. | | |
| 2007/0052922 A1 | 3/2007 | King et al. | | |
| 2013/0329184 A1 * | 12/2013 | Barzak | | G02C 7/12 351/159.56 |
| 2014/0327950 A1 * | 11/2014 | Trajkovska-Broach | | G02F 1/1525 359/265 |
| 2014/0340633 A1 * | 11/2014 | Luc | | G02C 13/003 351/159.73 |
| 2015/0140905 A1 * | 5/2015 | Godeau | | B24B 27/0076 451/43 |
| 2017/0139230 A1 | 5/2017 | Ambler et al. | | |
| 2018/0133987 A1 * | 5/2018 | Watanabe | | B33Y 10/00 |

* cited by examiner

SEMI-FINISHED LENS TO BE MACHINED FOR FORMING AN OPHTHALMIC LENS TO BE MOUNTED IN A SPECTACLE FRAME, SET AND A METHOD INVOLVING THE SAME

FIELD OF THE INVENTION

The invention relates to semi-finished lenses.

BACKGROUND ART

For enabling advanced personalization of a spectacle glass to a user while preventing having in stock a very important number of different spectacle glasses, it is known to have in stock semi-finished lenses having one optical face (in general the front face) which is finished and the other optical face (in general the rear face) which is to be surfaced for rendering the ophthalmic lens personalized to the prescription and possibly other data of the user.

SUMMARY OF THE INVENTION

The invention is directed to a semi-finished lens, which is improved and optimized and which is further convenient, simple, economic and easy to manufacture.

The invention accordingly provides a semi-finished lens to be machined for forming an ophthalmic lens dimensioned for the ophthalmic lens to be mounted in a spectacle frame, wherein:
  the semi-finished lens comprises (a) a blank formed in a first material having a first hardness, the blank having an outline, a first face and a second face, the second face being configured to be surfaced so as to constitute a first optical face of the ophthalmic lens, and (b) a top layer formed in a second material having a second hardness, the second hardness being greater than the first hardness, the top layer having an outline, a first face and a second face, the second face of the top layer being arranged on the first face of the blank;
  the outline of the top layer is equal to or included in the outline of the blank; and
  the outline of the top layer satisfies to a predetermined dimensional selection criterion involving the final outline of the ophthalmic lens.

The fact that the semi-finished lens according to the invention includes a top layer in a material having a hardness greater than the hardness of the blank and that the optical face to be surfaced belongs to the blank, enables to benefit together of the advantages of hard materials (such as the resistance to scratches and to efforts during machining steps) and the advantages of materials of lesser hardness such as the ease to be machined; while the personalization of the features of the outline of the top layer to the final outline of the ophthalmic lens minimizes the difficulties connected to machining a hard material. In particular, thanks to the semi-finished lens according to the present invention, the risk is limited of damaging the surfacing tool while surfacing the semi-finished lens having a top layer formed in a harder material than the one in which the blank is formed.

The semi-finished lens according to the invention is thus improved and optimized while being convenient, simple, economic and easy to manufacture.

According to features preferred as being very simple, convenient and economical for embodying the semi-finished lens according to the invention:

independently of said predetermined dimensional criterion, the outline of the top layer equates or includes the final outline of the ophthalmic lens and the outline of the blank equates or includes the final outline of the ophthalmic lens;
  in addition, the outline of the blank also satisfies to a predetermined dimensional selection criterion involving the final outline of the ophthalmic lens;
  the semi-finished lens is configured so that said blank can provide to said ophthalmic lens a fitting rib configured for being received in a fitting groove of a rim of said spectacle frame;
  the first material comprises plastic;
  the second material comprises glass;
  the top layer comprises an electrochromic element;
  the top layer comprises a light-guide optical element;
  the first face of the top layer is configured to constitute a second optical face of the ophthalmic lens; and/or
  the semi-finished lens is configured so as to be alternatively machined for forming another ophthalmic lens dimensioned for said another ophthalmic lens to be mounted in another spectacle frame, the outline of the top layer further satisfying to another predetermined dimensional selection criterion involving the final outline of the another ophthalmic lens.

The invention further provides a set including a semi-finished lens as described above and a data support containing data representative of said final outline of said ophthalmic lens to be mounted in said spectacle frame.

The set according to the invention is thus improved and optimized, while being convenient, simple, economic and easy to manufacture.

According to features preferred as being very simple, convenient and economical for embodying the set according to the invention, the set further includes a data support containing data representative of a range of predetermined outlines, with the outline of the top layer of the semi-finished lens being the outline in said range for which the difference between the area of the surface delimited by the outline of the top layer and the area of the surface delimited by the final outline of the ophthalmic lens is minimized, said dimensional selection criterion of the outline of the top layer being the minimization of said difference.

The invention further provides a method for manufacturing an ophthalmic lens having a first optical face, a second optical face and a final outline for the ophthalmic lens to be mounted in a spectacle frame, the method comprising:
  providing:
    a semi-finished lens comprising (a) a blank formed in a first material having a first hardness, the blank having an outline, a first face and a second face, the second face being configured to be surfaced so as to constitute a first optical face of the ophthalmic lens, and (b) a top layer formed in a second material having a second hardness, the second hardness being greater than the first hardness, the top layer having an outline, a first face and a second face, the second face of the top layer being arranged on the first face of the blank, the outline of the top layer being equal to or included in the outline of the blank, and the outline of the top layer satisfying to a predetermined dimensional selection criterion involving the final outline of the ophthalmic lens; and
    a data support containing data representative of said final outline of said ophthalmic lens to be mounted in said spectacle frame; and surfacing the second face of the blank of the semi-finished lens so as to form the first optical face of the ophthalmic lens.

The method according to the invention is thus improved and optimized, while being convenient, simple and economic.

According to further features preferred as being very simple, convenient and economical for implementing the method according to the invention:

said method further comprises edging the blank of the semi-finished lens of the set for the ophthalmic lens to be mounted in the spectacle frame; and/or said method further comprises edging the top layer of the semi-finished lens of the set for the ophthalmic lens to be mounted in the spectacle frame.

BRIEF DESCRIPTION OF THE DRAWINGS

The description of the invention now continues with a detailed description of a preferred embodiment given hereinafter by way of non-limiting example and with reference to the appended drawings. In these drawings.

DETAILED DESCRIPTION OF PREFERRED EMBODIMENTS

Figure 1:
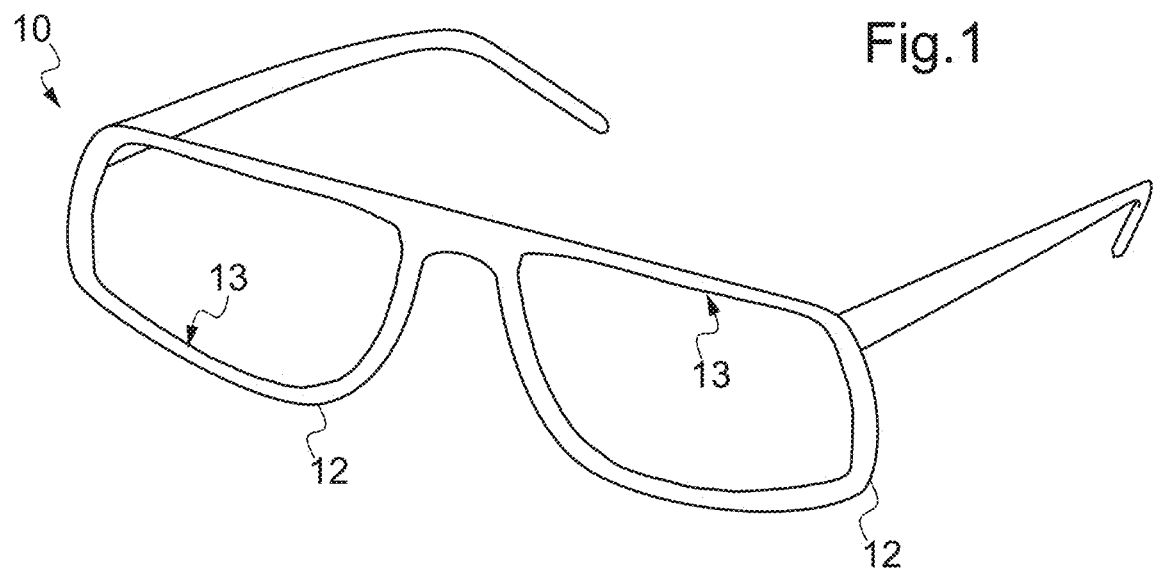
FIG. 1 is a schematic view of a spectacle frame.

FIG. 1 shows a spectacle frame 10 having two rims 12 each configured to receive an ophthalmic lens to be mounted in the spectacle frame 10.

Each of the rims 12 has an inner face having an outline 13. The inner face has along the outline 13 a profile here providing a fitting groove (not visible).

Figure 2:
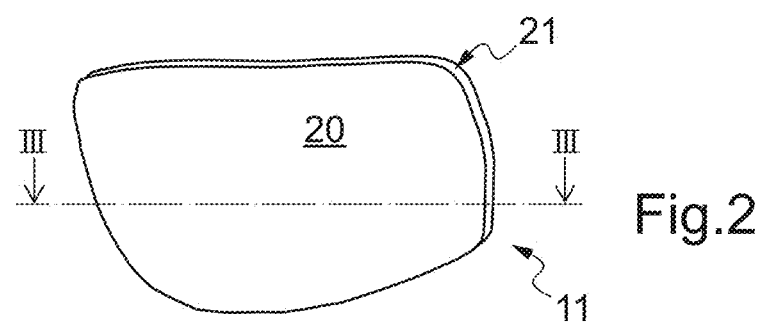
FIG. 2 is a schematic view of an ophthalmic lens dimensioned to be mounted in the frame illustrated in FIG. 1.
Figure 3:
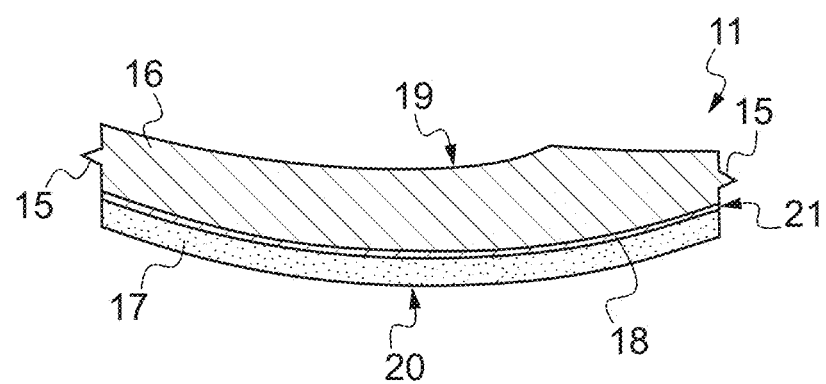
FIG. 3 is the cross-sectional view referenced by III-III in FIG. 2.

FIGS. 2 and 3 show an ophthalmic lens 11 configured to be mounted in the frame 10.

The lens 11 has a first, or back, optical face 19, a second, or front, optical face 20 opposite to the back optical face 19, and a lateral face 21 extending from one to the other of the back optical face 19 and front optical face 20.

The back optical face 19 is provided to be proximal to the eye of the user while the front optical face 20 is provided to be distal to the eye of the user, when the user wears the frame 10 in which is mounted the lens 11.

The back optical face 19 is here of generally concave shape, while the front optical face 20 is of generally convex shape.

The ophthalmic lens 11 is dimensioned for being received in one of the rims 12 of the spectacle frame 10, here the rim 12 visible on the right in FIG. 1.

More precisely, the lens 11 is dimensioned such that its lateral face 21 matches the inner face of the rim 12 having the outline 13.

The lateral face 21 has an outline 32, hereinafter referred to as the final outline. Along the final outline 32, the lateral face 21 has a profile here providing a fitting rib 15 (FIG. 2) configured for being received in the fitting groove of the inner face of the rim 12 so as to secure the lens 11 in the frame 10.

The lens 11 is a composite lens comprising a first part 16 and a second part 17 made of distinct materials.

The first part 16 is made of a first material comprising plastic while the second part 17 is made of a second material comprising mineral material.

The first part 16 is provided to be proximal to the eye of the user while the second part 17 is provided to be distal to the eye of the user, when the user wears the frame 10 in which is mounted the lens 11.

The back optical face 19 is formed on the first part 16, while the front optical face 20 is formed on the second part 17.

The fitting rib 15 is formed in the first part 16. The fitting rib 15 is therefore located in the portion of the lateral face 21 which belongs to the first part 16.

The back optical face 19 is shaped is accordance with a desired ophthalmic prescription for a user of the ophthalmic lens 11.

The lens 11 is further provided with a functional film 18 interposed between the first part 16 and the second part 17. The functional film 18 is here a polarizing film.

The manufacturing of the ophthalmic lens 11 will now be described with reference to FIGS. 4 to 8.

Figure 4:
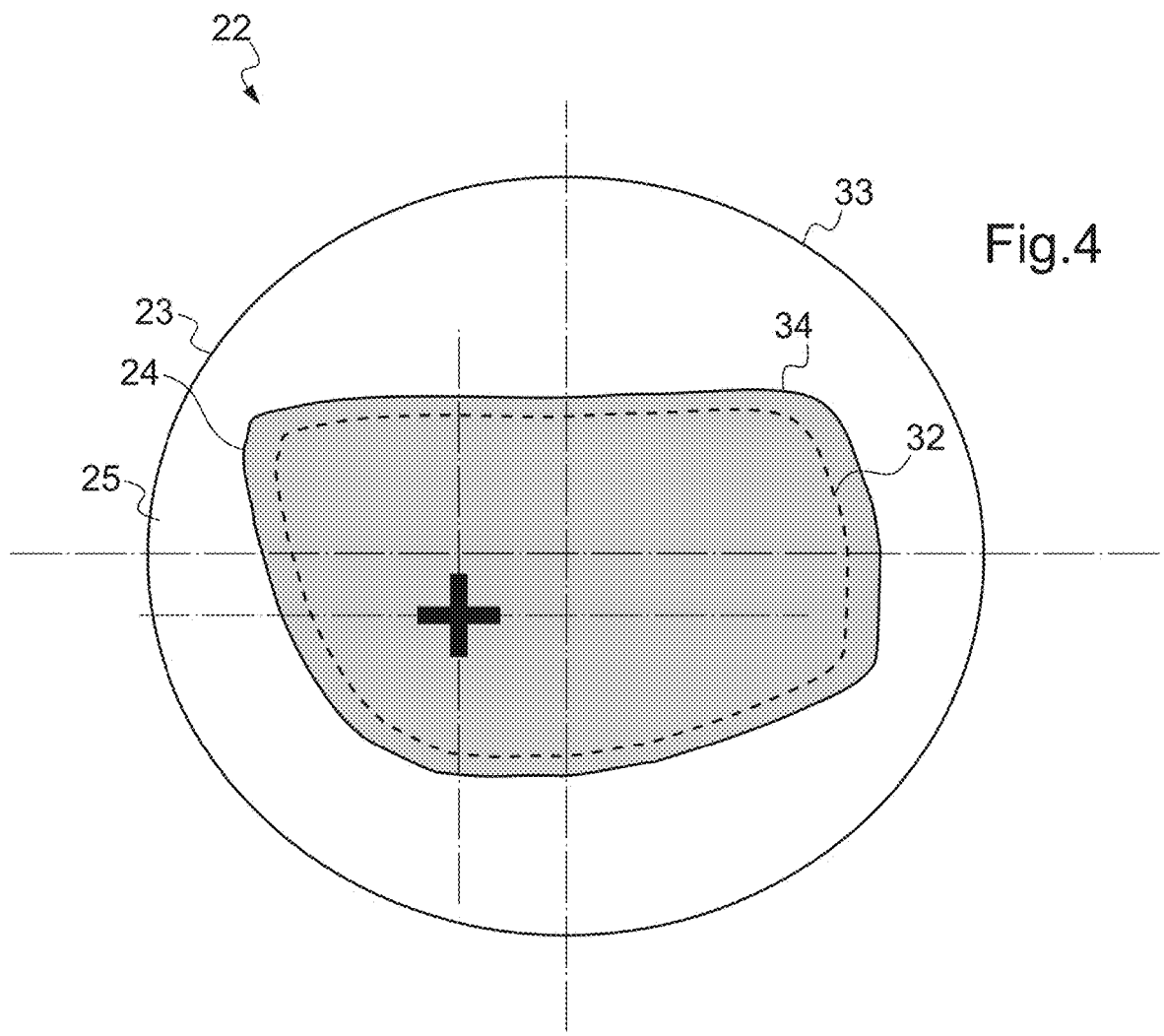
FIG. 4 is a top plan view of a semi-finished lens from which is obtained the ophthalmic lens shown on FIGS. 2 and 3.
Figure 5:
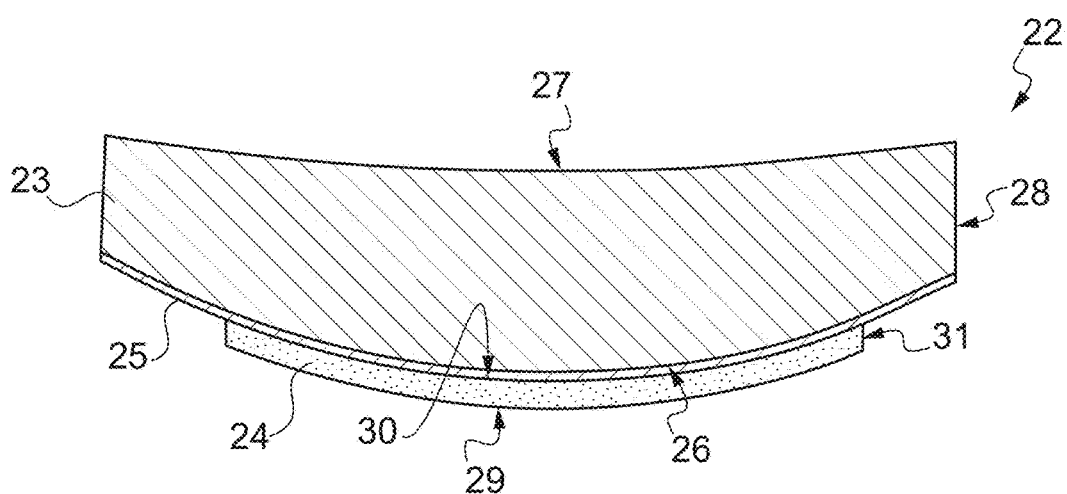
FIG. 5 is a cross-sectional view of the semi-finished lens of FIG. 4.

FIGS. 4 and 5 illustrate a semi-finished lens 22 from which is obtained the ophthalmic lens 11.

The ophthalmic lens 11 is manufactured by machining the semi-finished lens 22. The machining process here includes a surfacing operation and an edging operation.

The semi-finished lens 22 is a composite semi-finished lens which comprises a blank 23 and a top layer 24. The semi-finished lens 22 is here further provided with a functional film 25 interposed between the blank 23 and the top layer 24.

The blank 23, the top layer 24 and the functional film 25 are respectively configured to constitute, after the machining process, the first part 16, the second part 17 and the functional film 18 of the ophthalmic lens 11.

The blank 23 is accordingly made of the first material comprising plastic. The plastic here comprises polycarbonate. The top layer 24 is accordingly made of the second material comprising a mineral material. The mineral material here comprises glass.

The functional film 25 is accordingly here a polarizing film.

The blank 23 is here obtained by casting, injection molding and/or surfacing an initial blank.

The top layer 24 is here obtained by surfacing and/or thermoforming an initial blank.

The blank 23 and the top layer 24 have different hardness properties, here due to the respective nature of the materials they are made of.

More specifically, the first material forming the blank 23 has a first hardness while the second material forming the top layer 24 has a second hardness, the second hardness being greater than the first hardness.

The Young modulus of the blank 23 is here about 2 300 MPa. The Young modulus of the top layer 24 is here about 70 000 MPa.

In some variant, the mineral material forming the top layer 24 comprises synthetic sapphire; the Young modulus of the top layer 24 accordingly being about 440 000 MPa.

The top layer 24 is configured to enhance the overall stiffness of the semi-finished lens 22 by comparison with a similar semi-finished lens but that would not have a top layer of greater hardness. The additional stiffness permits to limit the deformation of the semi-finished lens during the blocking, surfacing and/or edging operations occurring during the machining process.

Depending on the nature of the material of which is made the top layer 24, the top layer 24 has a thickness in a range of about 0.01 mm to about 1 mm.

To produce the semi-finished lens 22, the top layer 24 and the functional film 25 are attached onto the blank 23, here by using adhesive means.

It should be noted that the top layer 24 is here indirectly attached to the blank 23. More precisely, the top layer 24 is attached to the functional film 25 while the latter is attached to the blank 23. In other words, the top layer 24 is attached to the blank 23 through the functional film 25.

The adhesive means comprises a polymerizable glue having a liquid state before polymerization. The liquid state permits the glue to match the respective shapes of the blank 23, top layer 24 and/or functional film 25 when gluing them to one another.

The polymerizable glue is configured to show flexible properties after polymerization so as to withstand the differential dilatation of the blank 23, top layer 24 and/or functional film 25 due to the thermal variations occurring during the surfacing and/or edging operations of the semi-finished lens 22.

For similar reasons, the glue is configured for not polymerizing under heating. The glue is here a UV polymerizable glue comprising an acrylate and/or epoxy based resin.

The glue which is interposed between the blank 23, top layer 24 and/or functional film 25 forms a layer of negligible thickness which is not represented on the drawings.

The blank 23 has a first, or front, face 26, a second, or rear, face 27 opposite to the front face 26, and a lateral face 28 extending from one to the other of the rear face 27 and front face 26.

The rear face 27 is here of generally concave shape, while the front face 26 is of generally convex shape.

The rear face 27 is configured to be surfaced so as to constitute the back optical face 19 of the ophthalmic lens 11.

The blank 23 is here of axisymmetric shape and has a predetermined outline 33, corresponding to the shape in cross-section of the lateral face 28, which is circular, as can be seen in FIG. 4.

The top layer 24 has a first, or front, face 29, a second, or rear, face 30 opposite to the front face 29, and a lateral face 31 extending from one to the other of the rear face 30 and front face 29.

The rear face 30 is here of generally concave shape, while the front face 29 is of generally convex shape.

The rear face 30 of the top layer 24 is arranged on the front face 26 of the blank 23. More precisely, and as explained above, due to the presence of the functional film 25 between the top layer 24 and the blank 23, the top layer 24 is here indirectly arranged on the front face 26 of the blank 23.

The front face 29 of the top layer 24 is configured to constitute the front optical face 20 of the ophthalmic lens 11.

In some variants (not illustrated), the semi-finished lens 22 comprises a functional coating arranged on the front face 29 of the top layer 24.

This functional coating is configured to constitute, after the machining process, a functional coating of the ophthalmic lens 11 arranged on the front optical face 20 of the ophthalmic lens 11.

Such a functional coating could be for example a hardcoat configured to improve the scratch resistance. It should be noted that such a hardcoat usually has a thickness in a range of about 0.001 mm to 0.003 mm and therefore does not enhance significantly the overall stiffness of the semi-finished lens 22, by contrast with the top layer 24.

The top layer 24 is of a predetermined shape and has a predetermined outline 34 corresponding to the shape in cross-section of the lateral face 31 (FIG. 4).

To give the top layer 24 its predetermined outline 34, the initial blank from which is obtained the top layer 24 has here been subjected to a pre-edging operation.

The edging operation is provided to remove the portion of the semi-finished lens situated between the outlines 33 and 34 and the final contour 32 with the final contour 32 positioned as a function of the pupil position of the wearer of the spectacle frame so that the reference point shown by a cross on FIG. 4 is aligned with the pupil position of the wearer.

As illustrated in FIG. 4, the outline 34 of the top layer 24, the outline 33 of the blank 23 and the final outline 32 of the ophthalmic lens 11 satisfy certain relationships.

The final outline 32 of the ophthalmic lens 11 is represented in dashed line in FIG. 4.

As a first relationship, the outline 34 of the top layer 24 is included in the outline 33 of the blank 23. The first relationship comprises the case where the outline of the top layer 24 is substantially equal to the outline of the blank 23.

As a second relationship, the outline 34 of the top layer 24 includes the final outline 32 of the ophthalmic lens 11 and the outline 33 of the blank 23 includes the final outline 32 of the ophthalmic lens 11. The second relationship comprises the cases where the outline 34 of the top layer 24 substantially equates the final outline 32 of the ophthalmic lens 11 and/or the outline 33 of the blank 23 substantially equates the final outline 32 of the ophthalmic lens 11.

It should be noted that in order to satisfy to the first and/or second relationships, the initial blank from which is obtained the blank 23 can be subjected to a pre-edging operation similar to the pre-edging operation to which is subjected the initial blank from which is obtained the top layer 24.

In addition, and independently of the first and second relationships mentioned above, the outline 34 of the top layer 24 satisfies to a predetermined dimensional selection criterion involving the final outline 32 of the ophthalmic lens 11.

The dimensional selection criterion will be explained in more details below by reference to FIGS. 6 to 8.

The dimensional selection criterion is part of a selection process in which the semi-finished lens 22 has been determined as appropriate based on said criterion, and therefore selected, in order to be machined for forming the ophthalmic lens 11.

The semi-finished lens 22 has been selected among a plurality of semi-finished lenses similar to the semi-finished lens 22 but having distinct respective shapes.

Figure 7:
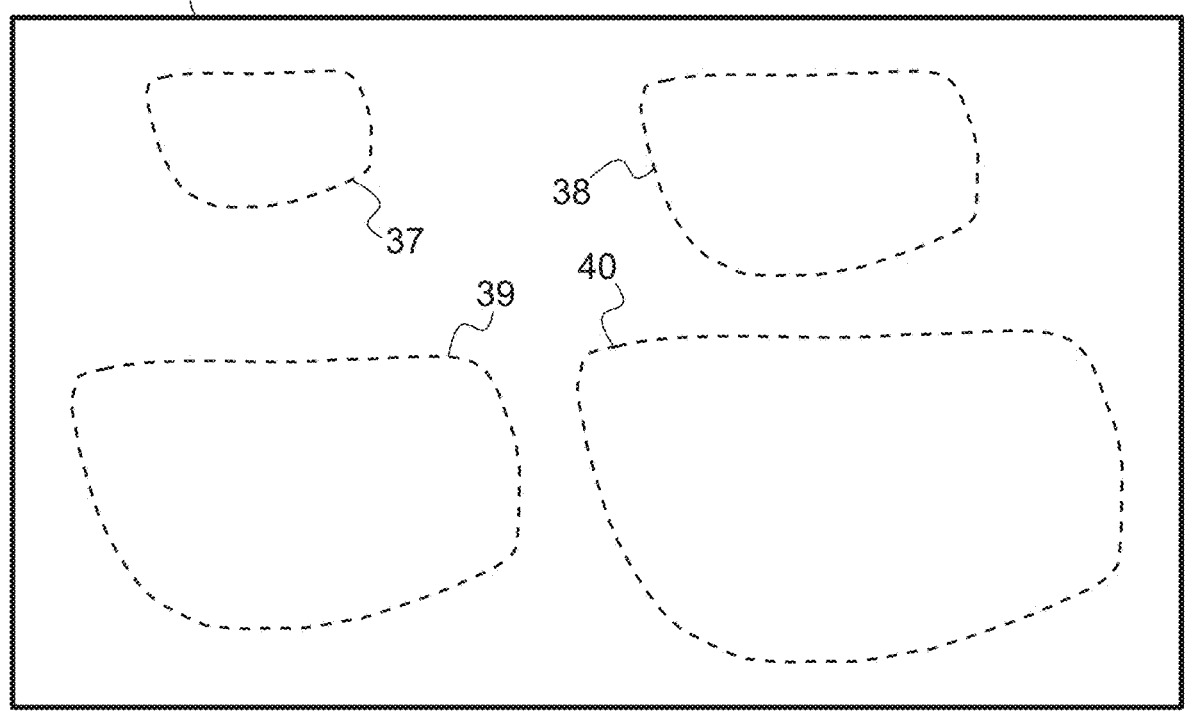
FIG. 7 schematically illustrates a data support containing data representative of a range of predetermined outlines present in respective semi-finished lenses of a predetermined range of semi-finished lenses.

In particular, the respective outlines of the top layer of each of the semi-finished lenses are distinct from each other and each correspond to a predetermined outline in a range of predetermined outlines (FIG. 7).

In the selection process, a semi-finished lens of the plurality of semi-finished lenses is determined as appropriate by comparing the final outline 32 of the ophthalmic lens 11 to each of the outlines in the range of predetermined outlines.

Data representative of the final outline 32 of the ophthalmic lens 11 need therefore to be acquired before making the comparison.

As explained above, the final outline 32 of the ophthalmic lens 11 is provided to match the outline 13.

Therefore, data representative of the final outline 32 of the lens 11 are obtained by acquiring data representative of the outline 13 of the rim 12 in which the lens 11 is to be received.

Such an acquisition is here carried out by an acquisition device (not illustrated) configured to determine the outline 13 of the rim 12.

Figure 6:
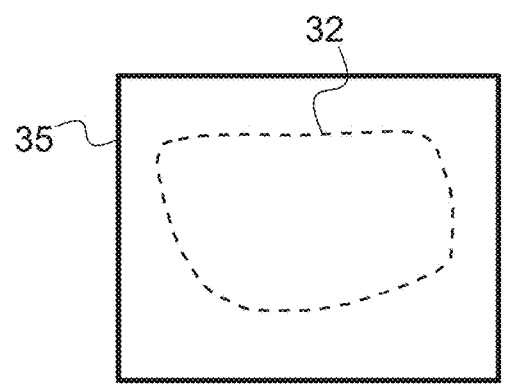
FIG. 6 schematically illustrates a data support containing data representative of the final outline of the ophthalmic lens.

FIG. 6 illustrates a first data support 35 containing data representative of the final outline 32 of the ophthalmic lens 11.

The data support 35 is here a computer storage device.

FIG. 7 illustrates a second data support 36 containing data representative of the range of predetermined outlines to which the final outline 32 of the ophthalmic lens 11 is to be compared.

The data support 36 is here a computer storage device.

The range of predetermined outlines comprises here four predetermined outlines, respectively a small outline 37, a medium outline 38, a large outline 39 and an extra-large outline 40.

The outlines 37-40 are here homothetic with respect to each other and therefore have similar shapes but define surfaces of distinct respective areas.

Figure 8:
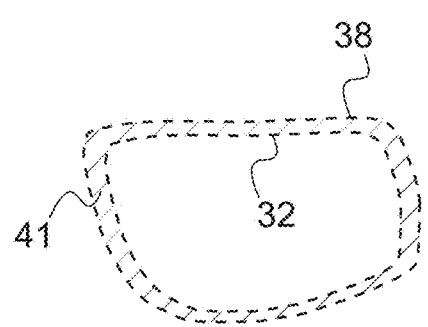
FIG. 8 illustrates a comparison step between the final outline of the ophthalmic lens and one of the predetermined outlines of the range of predetermined outlines.

In the selection process, the final outline 32 is compared to each of the outlines 37-40 by determining a differential area 41 corresponding to the difference between the area of the surface delimited by the respective predetermined outline 37-40 and the area of the surface delimited by the final outline 32 (FIG. 8).

Then, among the range of predetermined outlines 37-40, the predetermined outline for which the differential area 41 is minimized is selected.

Then, among the plurality of semi-finished lenses, the semi-finished lens of which the outline of the top layer corresponds to the predetermined outline minimizing the differential area 41 is selected.

In other words, the dimensional selection criterion of the outline of the top layer is the minimization of the differential area 41.

In the selection process illustrated here, the predetermined outline which has been selected is the medium outline 38, which corresponds to the outline 34 of the top layer 24 of the semi-finished lens 22.

Saying it differently, the outline 34 of the top layer 24 of the semi-finished lens 22 is the outline in the range of predetermined outlines 37-40 for which the difference between the area of the surface delimited by the outline 34 of the top layer 24 and the area of the surface delimited by the final outline 32 of the ophthalmic lens 11 is minimized, the dimensional selection criterion of the outline 34 of the top layer 24 being the minimization of said difference.

It should be noted that the small outline 37 here defines a surface having an area smaller than the area of the surface defined by the final outline 32. The small outline 37 therefore does not include the final outline 32 and does not satisfy the second relationship mentioned above. A semi-finished lens having a top layer of which the outline corresponds to the small outline 37 should therefore not be selected. This corresponds more generally to the case where the differential area 41 has a negative value.

For carrying on the selection process, it is used a computer system (not illustrated) comprising the acquisition device, the first data support 35, the second data support 36 and a processing unit. The acquisition device is configured to transmit the data acquired to the data support 35. The processing unit is configured to retrieve data from both the first data support 35 and second data support 36 and to determine the differential area 41 from the retrieved data.

The semi-finished lens 22 to be machined for forming the ophthalmic lens 11, the data support 35 containing data representative of the final outline of the ophthalmic lens 11, and the data support 36 containing data representative of the range of predetermined outlines form together a set.

After the semi-finished lens 22 has been selected, it is machined for forming the ophthalmic lens 11.

As previously mentioned, the machining process includes a surfacing operation and an edging operation.

The semi-finished lens 22 is previously attached onto a blocking device of a surfacing and/or edging machine configured to spin the semi-finished lens 22 during the surfacing and/or edging operation.

It should be noted in this respect that the top layer 24 is positioned with respect to the blank 23 so that the semi-finished lens 22 shows no or few rotating unbalance.

The rear face 27 of the blank 23 of the semi-finished lens 22 is then surfaced so as to form the back optical face 19 of the ophthalmic lens 11.

The surfacing and/or edging machine is here configured to perform a digital surfacing of the rear face 27.

The semi-finished lens 22 is then edged for the ophthalmic lens 11 to be mounted in the spectacle frame 10. The edging operation of the semi-finished lens 22 comprises forming the lateral face 21.

The edging operation of the semi-finished lens 22 comprises edging the blank 23 and/or edging the top layer 24.

In particular, the edging operation of the blank 23 comprises forming the portion of the lateral face 21 which comprises the fitting rib 15. The blank 23 is accordingly configured so that it can provide to the ophthalmic lens 11 the fitting rib 15. In particular, the initial size of the blank 23 is sufficient for shaping the fitting rib 15, which here radially extends beyond the second part 17 of the ophthalmic lens 11.

It should be noted that in the case where the outline 34 of the top layer 24 equates the final outline 32 of the lens 11, the edging operation of the top layer 24 is not necessary.

Figure 9:
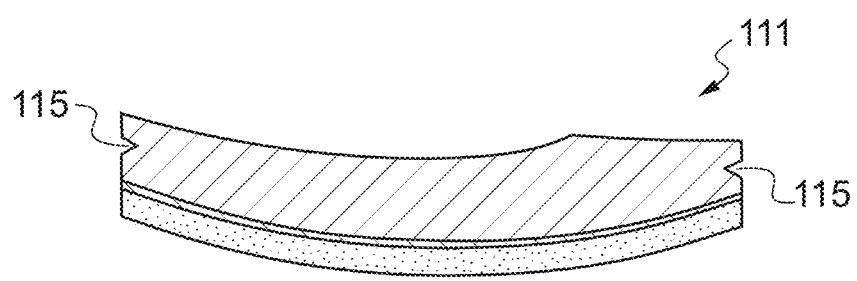
FIG. 9 illustrates a variant of the ophthalmic lens.

FIG. 9 illustrates a variant of the ophthalmic lens 111 for which the fitting rib 15 is replaced by a fitting groove 115 configured for receiving a fitting rib of a rim of a spectacle frame similar to the spectacle frame 10.

Such a fitting groove 115 can be formed in the case where the outline 33 of the blank 23 equates the final outline 32 of the lens 11, during the edging operation of blank 23.

In certain embodiments, the outline 33 of the blank 23 also satisfies to a predetermined dimensional selection criterion involving the final outline 32 of the ophthalmic lens, for instance in the embodiment with the rib 15 the additional dimensional selection criterion ensures that there is enough material in the blank for providing the rib 15.

It should be noted that the semi-finished lens 22 is able to be machined for becoming the lens 11 but of course also for becoming lenses having a different final outline of a different spectacle frame, provided that the different relationships and selection criterion disclosed above, but modified mutatis mutandis according to the different final outline, are satisfied.

In variants that are not illustrated:

the plastic material forming the blank is different from polycarbonate and comprises for instance acrylics, urethanes and/or another organic material;

the mineral material forming the top layer is different from glass and is for instance a crystalline material comprising for instance silica;

the semi-finished lens is deprived of a functional film, or the functional film is different from a polarizing film and is for example a selective filter;

the functional film is not interposed between the blank and the top layer but is arranged on the front face of the top layer or on the rear face of the blank;

the front optical face of the lens is deprived of a functional coating, or the functional coating is different from a hardcoat and comprises for example an anti-smudge coating, an hydrophobic coating, an anti-static coating, a mirror coating, an anti-reflective coating and/or a photochromic coating;

the first optical face of the ophthalmic lens refers to the front optical face of the ophthalmic lens while the second optical face of the ophthalmic lens refers to the back optical face of the ophthalmic lens;

the first part of the ophthalmic lens is provided to be distal to the eye of the user while the second part of the ophthalmic lens is provided to be proximal to the eye of the user, when the user wears the frame in which is mounted the ophthalmic lens;

the front face of the top layer is arranged on the rear face of the blank;

the front face of the blank is of generally concave shape while the rear face of the blank is of generally convex shape;

the data supports are different from a computer storing device and comprises for example a first tracing paper and a second tracing paper on which are respectively drawn the final outline of the ophthalmic lens and predetermined outlines of the range of semi-finished lenses;

the top layer comprises an electrochromic element; and/or the top layer comprises a light-guide optical element.

It should be noted more generally that the invention is not limited to the examples described and represented.

The invention claimed is:

1. A set comprising:
   (i) a semi-finished lens to be machined for forming an ophthalmic lens dimensioned for the ophthalmic lens to be mounted in a spectacle frame, the semi finished lens comprising
       a blank formed in a first material having a first hardness, the blank having
           an outline,
           a first face, and
           a second face configured to be surfaced to constitute a first optical face of the ophthalmic lens, and
       a top layer formed in a second material having a second hardness that is greater than the first hardness, the top layer having
           an outline,
           a first face, and
           a second face of the top layer arranged on the first face of the blank,
           the outline of the top layer being equal to or included in the outline of the blank;
   (ii) a first data support containing data representative of a final outline of said ophthalmic lens, the outline of the top layer satisfying a predetermined dimensional selection criterion involving said final outline of the ophthalmic lens as represented by the data representative of said final outline contained in the first data support; and
   (iii) a second data support containing additional data representative of a range of predetermined outlines, the outline of the top layer of the semi-finished lens being the outline in said range for which the difference between the area of the surface delimited by the outline of the top layer and the area of the surface delimited by the final outline of the ophthalmic lens is minimized, said predetermined dimensional selection criterion of the outline of the top layer being the minimization of said difference.

2. The set according to claim 1, wherein, independently of said predetermined dimensional criterion, the outline of the top layer equates or includes the final outline of the ophthalmic lens and the outline of the blank equates or includes the final outline of the ophthalmic lens.

3. The set according to claim 2, wherein the outline of the blank satisfies a predetermined dimensional selection criterion involving the final outline of the ophthalmic lens.

4. The set according to claim 2, wherein said blank is configured to provide a fitting rib to the ophthalmic lens, the fitting rib being configured to be received in a fitting groove of a rim of said spectacle frame.

5. The set according to claim 2, wherein the first material comprises plastic.

6. The set according to claim 1, wherein the outline of the blank satisfies a predetermined dimensional selection criterion involving the final outline of the ophthalmic lens.

7. The set according to claim 6, wherein said blank is configured to provide a fitting rib to the ophthalmic lens, the fitting rib being configured to be received in a fitting groove of a rim of said spectacle frame.

8. The set according to claim 1, wherein said blank is configured to provide a fitting rib to the ophthalmic lens, the fitting rib being configured to be received in a fitting groove of a rim of said spectacle frame.

9. The set according to claim 1, wherein the first material comprises plastic.

10. The set according to claim 1, wherein the second material comprises glass.

11. The set according to claim 1, wherein the top layer comprises an electrochromic element.

12. The set according to claim 1, wherein the top layer comprises a light-guide optical element.

13. The set according to claim 1, wherein the first face of the top layer is configured to constitute a second optical face of the ophthalmic lens.

14. The set according to claim 1, wherein the semi-finished lens is configured to be alternatively machined to form another ophthalmic lens dimensioned for said other ophthalmic lens to be mounted in another spectacle frame, the outline of the top layer further satisfying another predetermined dimensional selection criterion involving the final outline of the other ophthalmic lens.

15. The set according to claim 1, wherein said range of different predetermined outlines comprises plural predetermined outlines that are homothetic with respect to each other and that define surfaces of distinct respective areas.

16. A method for manufacturing an ophthalmic lens having a first optical face, a second optical face, and a final outline for the ophthalmic lens to be mounted in a spectacle frame, the method comprising:

providing:
- a semi-finished lens including
  - a blank formed in a first material having a first hardness, the blank having
    - an outline,
    - a first face, and
    - a second face configured to be surfaced to constitute a first optical face of the ophthalmic lens, and
  - a top layer formed in a second material having a second hardness that is greater than the first hardness, the top layer having
    - an outline,
    - a first face, and
    - a second face of the top layer arranged on the first face of the blank,
    - the outline of the top layer being equal to or included in the outline of the blank,
    - the outline of the top layer satisfying a predetermined dimensional selection criterion involving the final outline of the ophthalmic lens,
- a first data support containing data representative of said final outline of said ophthalmic lens to be mounted in said spectacle frame, and
- a second data support containing additional data representative of a range of predetermined outlines;

retrieving the data representative of said final outline from the first data support; and using the retrieved data representative of said final outline, surfacing the second face of the blank of the semi-finished lens to form the first optical face of the ophthalmic lens, wherein the additional data is used so that the outline of the top layer of the semi-finished lens is the outline in said range for which the difference between the area of the surface delimited by the outline of the top layer and the area of the surface delimited by the final outline of the ophthalmic lens is minimized, said predetermined dimensional selection criterion of the outline of the top layer being the minimization of said difference.

17. The method according to claim 16, further comprising edging the blank of the semi-finished lens of the set for the ophthalmic lens to be mounted in the spectacle frame.

18. The method according to claim 16, further comprising edging the top layer of the semi-finished lens of the set for the ophthalmic lens to be mounted in the spectacle frame.

19. The method according to claim 16, wherein said range of different predetermined outlines comprises plural predetermined outlines that are homothetic with respect to each other and that define surfaces of distinct respective areas.

* * * * *